A. A. BOWSER.
LUBRICATOR FILLING VESSEL.
APPLICATION FILED APR. 11, 1907.
1,015,470.
Patented Jan. 23, 1912.
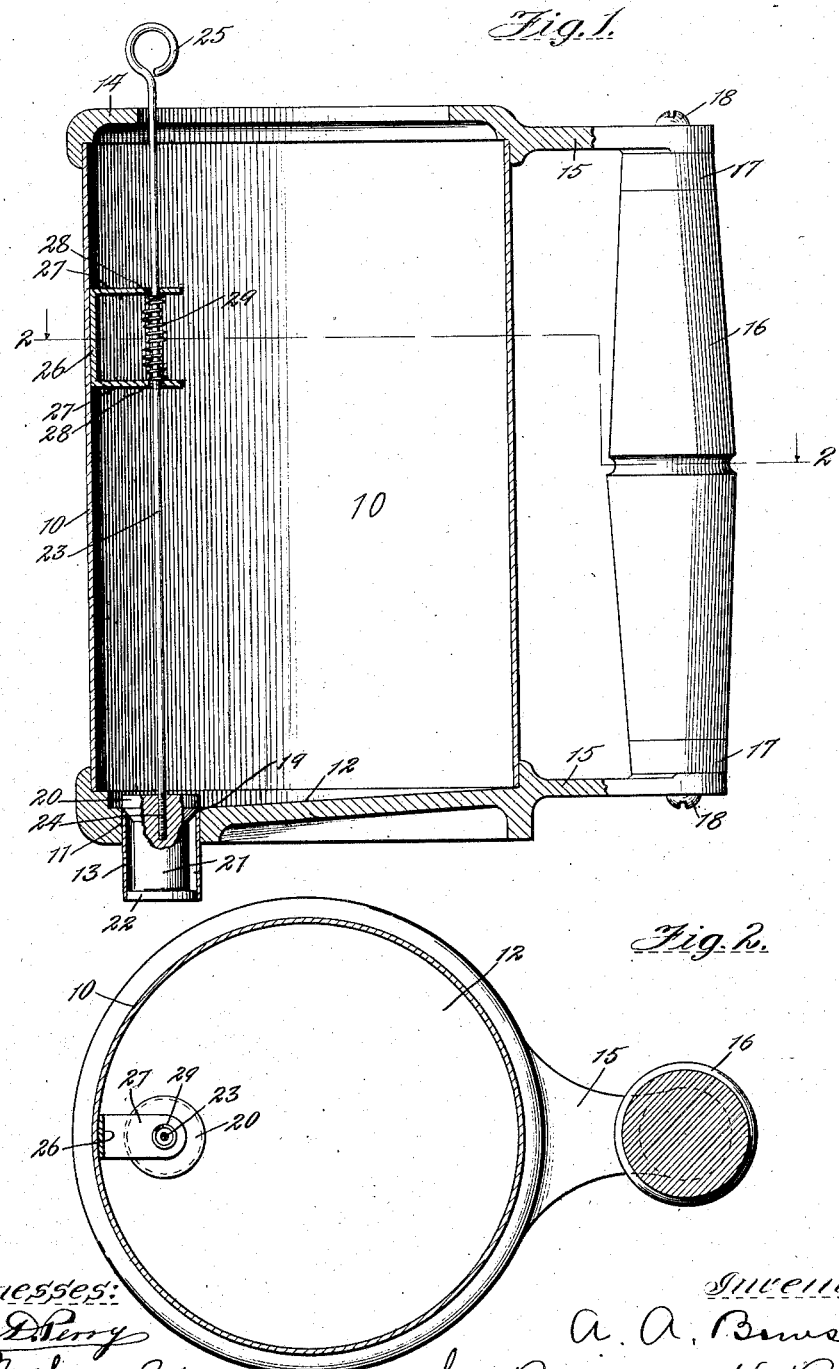

UNITED STATES PATENT OFFICE.

ALLEN A. BOWSER, OF FORT WAYNE, INDIANA, ASSIGNOR TO S. F. BOWSER & COMPANY, INCORPORATED, OF FORT WAYNE, INDIANA, A CORPORATION OF INDIANA.

LUBRICATOR-FILLING VESSEL.

1,015,470.  Specification of Letters Patent.  Patented Jan. 23, 1912.

Application filed April 11, 1907. Serial No. 367,559.

*To all whom it may concern:*

Be it known that I, ALLEN A. BOWSER, a citizen of the United States, residing at Fort Wayne, county of Allen, and State of Indiana, have invented certain new and useful Improvements in Lubricator-Filling Vessels, of which the following is a specification.

This invention relates to improvements in lubricator filling vessels and the primary object of the same is to provide an improved device of this character for supplying the lubricant to the lubricator, and improved means for preventing the liquid from dripping from the discharge spout when the valve for controlling the outlet is closed.

A further object is to provide improved means for adjusting the valve and improved means for securing the valve in its adjusted position.

To the attainment of these ends and the accomplishment of other new and useful objects, as will appear, the invention consists in the features of novelty in the construction, combination and arrangement of the several parts hereinafter more fully described and claimed and shown in the accompanying drawing, illustrating an exemplification of the invention, and in which—

Figure 1 is a vertical sectional view of an improved device of this character constructed in accordance with the principles of this invention. Fig. 2 is a sectional view on line 2—2 of Fig. 1.

Referring more particularly to the drawing and in this exemplification of the invention, the numeral 10 designates a receptacle of any desired size and configuration and constructed of any suitable material, such as metal or the like, and said receptacle is preferably provided with a discharge outlet 11 in the bottom thereof and said bottom preferably inclines toward the discharge outlet 11 as at 12, in order to direct the liquid in the receptacle to the outlet. A nozzle 13 is secured adjacent the outlet 11 and said nozzle preferably projects below the bottom of the receptacle in order to permit the nozzle to be inserted into the receptacle which is to be filled. The receptacle 10 is also preferably provided with an annular flange 14, which extends a short distance over the edge of the body portion of the receptacle which may serve to prevent the liquid from running out over the top of the receptacle when the receptacle is tilted.

Extending laterally beyond the receptacle, preferably at the top and bottom thereof, are arms or projections 15 and disposed between these arms or projections is a handle 16, which is preferably provided with a metal ferrule 17 surrounding the ends thereof and said handle is preferably of such a length that its extremities will engage the arms or projections 15 and is secured in position in any desired or suitable manner, preferably by means of screws or bolts 18 which pass through the arms or projections 15 and into the ends of the handle 16, the arms or projections 15 being of such a length that the handle 16 will be spaced from the side of the receptacle 10.

The bottom of the receptacle is provided with a valve seat 19, and 20 designates a valve which is adapted to coöperate with the seat 19 to close the discharge outlet 11. The valve 20 is provided with an extension or projecting portion 21, which is adapted to extend into the nozzle 13 when the valve is seated, and surrounding the free extremity of the extension or projection 21 is a circumferential flange or enlargement 22 and said flange or enlargement is preferably of a diameter slightly smaller than the internal diameter of the discharge nozzle 13 so that when the extension or projection 21 is moved into the nozzle 13 as the flange is seated, the flange or enlargement 22 will engage the wall of the nozzle and wipe the fluid from the wall which has adhered thereto, so that when the valve 20 is seated, the flange or enlargement 22 will stand substantially flush with the extremity of the nozzle 13 to prevent an accumulation and hardening of oils or liquids in the nozzle immediately below the valve seat which might in time wholly or partly obstruct the discharge opening, particularly when paint, oils, varnishes and liquids of like nature which have volatile ingredients are to be discharged through the nozzle.

Any suitable means may be provided for operating the valve 20. A suitable and efficient means for accomplishing this purpose comprises a stem or rod 23, which is preferably detachably connected to the valve 20 by means of its threaded extremity 24 entering a suitable threaded aperture in the valve 20. This stem or rod 23 preferably projects beyond the top of the receptacle 10 and is provided with a loop or eye 25, which is of such a size as to permit the operator to insert his finger therein. The stem or rod 23 passes through a suitable guide 26 which is secured within the receptacle, preferably near the top thereof and said guide 26 comprises spaced arms 27 which latter are provided with suitable apertures 28 through which the rod or stem 23 passes. Disposed between the arms 27 and preferably surrounding the rod or stem 23 is a yielding member 29, such as a coil spring or the like, and said spring is of such a length as to be placed between the arms 27 under tension and serves to frictionally engage and bind the stem or rod 23 to hold the rod in position.

When the operator raises the stem or rod 23 by means of the loop or eye 25 to unseat the valve 20, the rod will slide through the slots or apertures 28 in the arms 27 and when released, the friction caused by the arms 27 on the rod or stem 23 under the influence of the yielding member 29 will hold the rod and valve 20 in their adjusted position, and the friction will be sufficient to hold the rod or stem against accidental movement but will permit the valve to be moved when pressure or force is exerted by the operator upon the rod or stem. Obviously when it is desired to draw liquid from the receptacle, the stem 23 must be raised until the flange 22 on the portion 21 is above the bottom of the receptacle.

In order that the invention might be fully understood by those skilled in the art, the details of the foregoing embodiment thereof have been thus specifically described but

What I claim as new therein and desire to secure by Letters Patent is—

1. In a device of the class described, the combination of a receptacle provided with a discharge outlet, a valve for controlling the outlet, a stem for operating the valve, a guide for the stem, a flexible member coöperating with the guide and through which the stem passes, and adapted to bind against the stem and to hold the valve in its adjusted position, and means operatively related to the valve adapted to engage the wall of the outlet and wipe the liquid therefrom to prevent accumulation of liquid discharged into the nozzle beyond the valve seat.

2. In a device of the class described, the combination of a receptacle provided with a discharge outlet, a valve for controlling the outlet, a stem for operating the valve, a guide for the stem, said guide comprising spaced members through which the stem passes, a spring disposed between the members to frictionally engage the stem to hold the valve in any of its adjusted positions and means operatively related to the valve for wiping the fluid from the wall of the outlet to prevent dripping when the valve is closed.

In testimony whereof I have signed my name to this specification, in the presence of two subscribing witnesses, on this 27th day of March A. D. 1907.

ALLEN A. BOWSER.

Witnesses:
S. B. BECHTEL,
H. M. BOWSER.